Patented Nov. 16, 1937

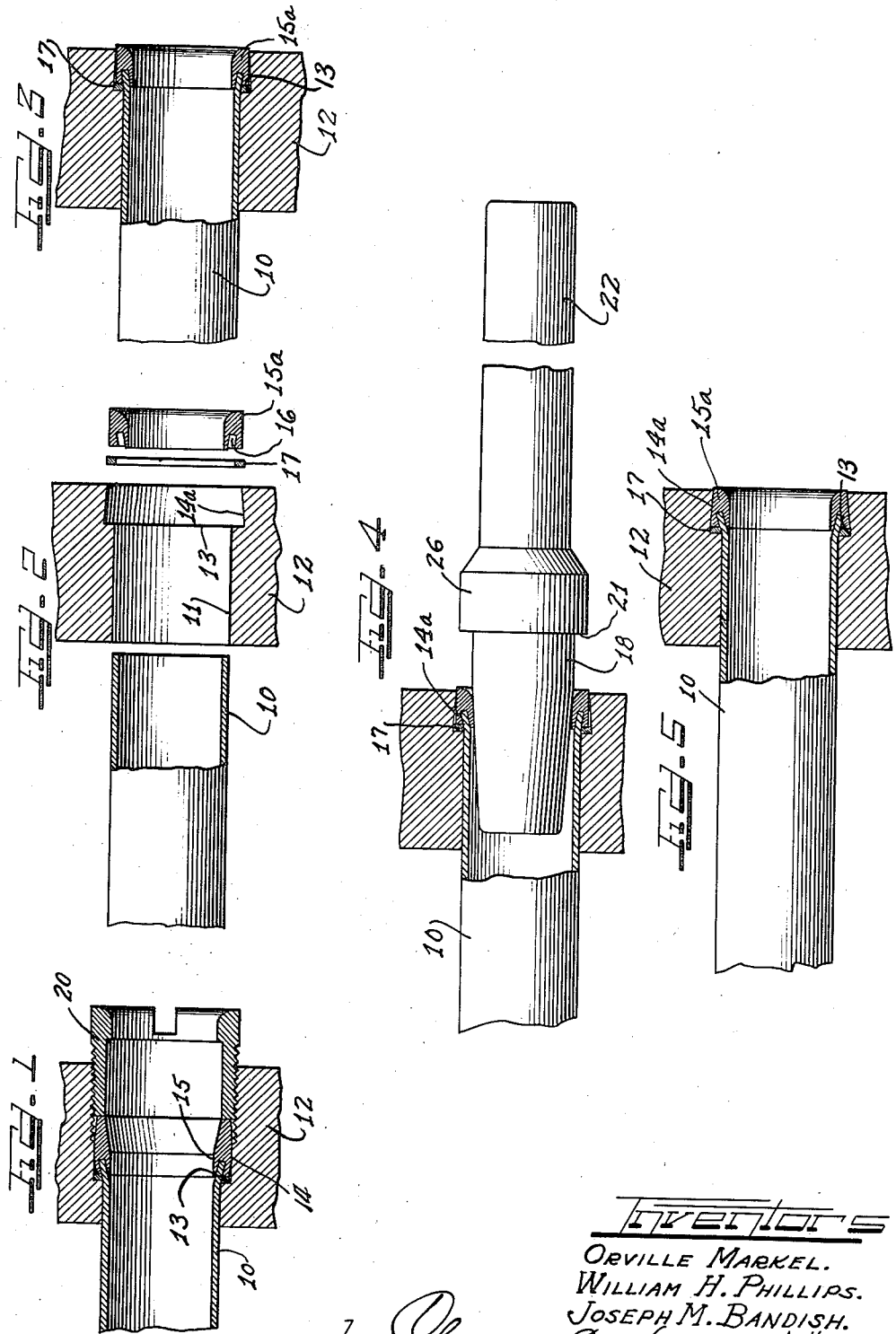

2,099,026

UNITED STATES PATENT OFFICE 2,099,026

CONDENSER TUBE SEAL

Orville Markel, Chicago, William H. Phillips, Oak Park, and Joseph M. Bandish, Chicago, Ill.

Application May 15, 1936, Serial No. 79,876

4 Claims. (Cl. 285—56)

This invention relates to improved tubing seals for condensers and the like wherein a plurality of tubes are mounted at each end in tube sheets forming partitions in the condenser shell.

It has heretofore been the practice to mount and seal condenser tubes by relatively soft packing or lead calking inserted around the ends of the tube, such calking serving as a seal but lacking control of expansion and contraction of the tubes, which consequently are apt to work loose and cause blow outs. It is accordingly an important object of this invention to provide a condenser tube seal acting both as a liquid tight seal and to rigidly position the tube at both ends to prevent blow outs.

It is a further important object of this invention to provide an improved and simplified condenser tube seal wherein the tube is expanded into a collar which in turn is expanded into a shouldered aperture in the tube sheet to provide both circumferential and longitudinal sealing surfaces cooperating with the tube sheet apertures to maintain liquid tightness throughout the life of the tubing.

It is also an important object of this invention to provide an improved and simplified condenser tube seal that can be applied in service by means of a single simple tool which serves to expand both the tube and collar into an enduring liquid tight seal with the tube sheet without tending to distort the latter as more and more of the tubes are sealed in place.

It is a further object of this invention to provide an improved and more durable tube seal of the type described that can be economically manufactured and simply installed even in relatively inaccessible places, thus permitting more compact condenser design.

Other and further important objects of this invention will be apparent from the disclosures in the specification and the accompanying drawing.

This invention (in a preferred form) is illustrated in the drawing and hereinafter more fully described.

On the drawing:

Figure 1 shows the completed seal with the sealing tool removed and replaced by a threaded sleeve which holds the seal bushing against its packing ring.

Figures 2 to 5 inclusive show a sequence of operations on a simplified form of tubing seal wherein the threaded sleeve is omitted.

As shown on the drawing:

Two forms of the invention have been chosen for illustrative purposes, that of Figure 1 being more elaborate and better adapted for the most severe requirements; while the second form of Figures 2 to 5 is simple, less expensive, and entirely adequate for less exacting situations.

In both forms of the invention the primary object is to secure the free end of a thin walled condenser tube 10 in an aperture 11 in a tube sheet 12. This is accomplished by providing the aperture 11 with a shoulder 13, by counterboring the tube sheet at 14, and providing a bushing 15 having an inclined channel 16 into which the end of the tube 11 is flared, the bushing 15 seating on an elastic but relatively hard packing ring 17 which abuts against the shoulder 13. The packing ring may be made of hard fibre, vulcanized rubber, or other materials such as leather or lead, as the conditions of the installation require.

In both illustrated forms of the invention, the bushing 15 is a loose fit in the counterbore 14 and is expanded into sealing contact therewith by driving a tapered tool 18 therethrough, which tool expands the internal diameter of the bushing to approximately the clear diameter of the tube to avoid restrictions to fluid flow through the completed seal.

In the first disclosed form of the invention as shown in Figure 1, the counterbore 14 is partially threaded at 19 to receive a threaded locking sleeve 20 which serves to hold the bushing 15 against the gasket 17 and shoulder 13. The locking sleeve thus serves to maintain the seal against excessive longitudinal expansion of the tube 10 such as might result from alternating high and low temperatures which would tend to pull an ordinary calked joint, causing a blowout.

In the second form of the invention the counterbore 14ª is so tapered that its diameter is greater adjacent the gasket seat or shoulder 13 than at the surface of the tube sheet 12, and the bushing 15ª is expanded into the tapered counterbore by a tapered expanding tool 18 which carries a shoulder 21 to assure seating of the bushing during the expansion thereof. The tapered counterbore thus serves to hold the bushing and tube against longitudinal movement due to expansion, and so serves the purpose of the threaded locking sleeve 20 disclosed in the first embodiment of the invention.

In assembling the seals of this invention the tube sheets 12 are drilled and counterbored for the desired number of tubes 10, which latter are cut to length with squared ends. Next the tubes are inserted in their apertures in the tube sheets, and the bushings 15 or 15a are inserted in the counterbores 14 or 14a and driven onto the ends of the tubes 10 thus flaring the latter into the inclined channels or grooves 16 in the bushings, as shown in Figure 4.

In the second form of the invention the shank 22 of an expansion tool is provided with a collar 26 rigid therewith which provides the previously mentioned shoulder 21 for seating the bushing against the packing ring 17 at the same time the bushing is expanded to fill the tapered counterbore. By tapping sideways on the shank 22 of the tool it will be loosened in the bushing while at the same time further enlarging the bushing to permit withdrawal of the tool.

It will thus be seen that we have invented an improved and simplified condenser tube seal that is permanent in character, economical to manufacture and install and adapted to resist expansion and contraction of the tubes in service.

We are aware that many changes may be made and numerous details of construction may be varied through a wide range without departing from the principles of this invention, and we, therefore, do not purpose limiting the patent granted hereon otherwise that necessitated by the prior art.

We claim as our invention:

1. A condenser tube seal comprising in combination with tubes and tube sheets, the latter having counterbored apertures to receive the ends of the tubes, bushings expansible into the counterbores of the tube sheet apertures, said bushings having inclined channels therein into which the tube ends are adapted to be flared by forcing the bushings over the tube ends.

2. A condenser tube seal comprising in combination with a tube and tube sheet apertured and counterbored to receive the end of the tube, a bushing having an inclined circular channel into which the end of the tube is adapted to be flared, said bushing being an initially loose fit in the tube sheet counterbore, and adapted to be expanded into sealing contact with the walls of the tube sheet counterbore.

3. A condenser tube seal comprising in combination with a tube and tube sheet apertured and counterbored to receive the end of the tube, a bushing having an inclined circular channel into which the end of the tube is adapted to be flared, said bushing being an initially loose fit in the tube sheet counterbore, and adapted to be expanded into sealing contact with the walls of the tube sheet counterbore, the tube sheet counterbore being of increased diameter at its bottom whereby expansion of the bushing into the counterbore locks the bushing against longitudinal movement.

4. A condenser tube seal comprising in combination with a tube end and a tube sheet, the latter having a counterbored aperture through which the tube end can partially extend with an enlarged space about the free end of the tube formed by said counterbore, a packing ring inserted in said counterbore and surrounding the tube, and a bushing radially expansible into the tube sheet counterbore, said bushing having an inclined channel therein into which the tube end is adapted to be flared by forcing the bushing over the tube end into contact with the packing ring.

ORVILLE MARKEL.
WILLIAM H. PHILLIPS.
JOSEPH M. BANDISH.